United States Patent [19]

Marsh

[11] 4,379,899
[45] Apr. 12, 1983

[54] PROCESS FOR PRODUCING POLYISOBUTENES

[75] Inventor: Christopher R. Marsh, Grangemouth, England

[73] Assignee: BP Chemicals Limited, London, England

[21] Appl. No.: 312,953

[22] Filed: Oct. 20, 1981

Related U.S. Application Data

[63] Continuation-in-part of Ser. No. 941,779, Sep. 13, 1978, abandoned.

[30] Foreign Application Priority Data

Sep. 14, 1977 [GB] United Kingdom ............... 38266/77

[51] Int. Cl.³ .......................... C08F 4/64; C08F 10/10
[52] U.S. Cl. .................................... 526/144; 526/188; 526/348.7
[58] Field of Search ....................... 526/144, 188, 348.7

[56] References Cited

U.S. PATENT DOCUMENTS 3,058,963 10/1962 Vandenberg ..................... 526/348.7
3,066,123 11/1962 Strohmayer et al. ............... 526/188
3,432,513 3/1969 Miller et al. ......................... 526/144
3,560,458 2/1971 Kennedy et al. ................. 526/348.7
3,957,743 5/1976 Nalta et al. ....................... 526/169.2

FOREIGN PATENT DOCUMENTS 226139 12/1959 Australia ............................. 526/902
1186 3/1979 European Pat. Off. ............ 526/144
1163339 9/1969 United Kingdom .
1442465 7/1976 United Kingdom ................ 526/902

Primary Examiner—Edward J. Smith
Attorney, Agent, or Firm—Brooks, Haidt, Haffner & Delahunty

[57] ABSTRACT

High molecular weight polybutenes having a viscosity SSU above 1,000,000 at 210° F. are produced by using a three-component catalyst system containing an alkyl aluminium halide, tertiary butyl halide and a metal halide selected from $SnCl_4$, $SnBr_4$, $TiCl_4$, and $TiBr_4$. The reaction phase is homogeneous and the catalyst components are added as a solution in an inert solvent. The polyisobutene product so produced are useful additives for oil, adhesives and mastics.

1 Claim, No Drawings

PROCESS FOR PRODUCING POLYISOBUTENES

This application is a continuation-in-part of copending application Ser. No. 941,779 filed Sept. 13, 1978, now abandoned.

The present invention relates to a method of producing high molecular weight polyisobutenes using a novel catalyst system.

It is known to produce polybutenes using cationic polymerisation catalysts. A typical example is a Friedel-Crafts catalyst such as aluminium chloride dissolved in an alkyl halide. It has been necessary to use an alkyl halide as solvent because aluminium chloride is virtually insoluble in hydrocarbons. Even in alkyl halides, aluminium chloride is only sparingly soluble. This low solubility has given rise to many difficulties in the control of the polymerisation reaction. For example, it is difficult to prepare the catalyst, determine precisely the amount of catalyst to be used and yet more difficult to calculate the introduction rate of the catalyst into the reactor. In addition, high molecular weight polybutenes have hitherto been produced commercially only by using a relatively pure $C_4$ isomer because mixed isomers have resulted only in polymers of low or moderate molecular weight.

It has now been found that high molecular weight polyisobutenes can be produced from mixed butane-butene streams with the necessary control on catalyst quality, concentration and solubility by using a new three-component catalyst system.

Accordingly, the present invention is a homogeneous process for producing high molecular weight polyisobutenes of SSU viscosity above 1,000,000 at 210° F. by polymerising a $C_4$ feedstock comprising isobutene in the presence of a catalyst system comprising (i) an organo aluminium compound of the formula $R_nAlX_{3-n}$ wherein R represents the same or different alkyl radicals having between 1 and 6 carbon atoms X represents chlorine or bromine and n is 1, 2 or 3, (ii) tertiary butyl chloride or bromide, and (iii) a metal halide selected from $SnCl_4$, $SnBr_4$, $TiCl_4$ and $TiBr_4$.

By the term "high molecular weight polyisobutenes" is meant here and throughout the specification polyisobutenes having an SSU viscosity above 1,000,000 at 210° F. Such polyisobutenes are considered to have a weight average molecular weight (Mw) above 10,000 determined by gel permeation chromatography.

The $C_4$ hydrocarbon feedstock may be the products of a thermal or catalytic cracking operation but in both cases butadienes and acetylenic compounds must be removed prior to polymerisation. The feedstock may contain between 10 and 100% by weight of isobutenes. It would be preferable to use a feedstock containing at least 50% by weight of isobutene. However, conventional feedstock containing between 15 and 50% by weight of isobutene may be used to obtain the desired product. Hydrocarbon feedstocks containing in addition to isobutene between 10 and 20% by weight of butanes and/or between 20 and 40% by weight of normal butenes may be used without adverse effects on the polyisobutene product.

The alkyl aluminium compound in the catalyst system has the general formula $R_nAlX_{3-n}$ where R may be a $C_1$ to $C_6$ alkyl radical and X may either be chlorine or bromine and n is 1, 2 or 3. Where the organo aluminium compound has more than one alkyl group, these alkyl groups may be the same or different. Ethyl aluminium dihalides and particularly ethyl aluminium dichloride, are preferred.

The relative concentrations of the three components in the catalyst system of the present invention may vary over a moderately wide range depending upon the nature of the organo aluminium compound used. Thus, in the catalyst system, the molar ratio of the organo-aluminium compound to metal halide is suitably between 1:10 and 10:1, preferably between 1:4 and 4:1. Similarly, the molar ratio of the organo-aluminium compound to tertiary butyl halide is suitably between 1:10 and 10:1, preferably between 1:4 and 4:1. For example if an alkyl aluminium dihalide is used the three catalyst components are preferably used in substantially equimolar amounts. The catalyst concentration for the reaction would depend upon the feed composition, the product desired, the temperature and the residence time. As a general guide, the catalyst concentration, assuming substantially equimolar proportions are used but based on the organo-aluminium compound content thereof, is suitably between 20 and 2000 ppm, preferably between 50 and 300 ppm and most preferably between 80 and 120 ppm by weight of the $C_4$-stream.

The catalyst system is suitably introduced into the polymerisation reactor as a solution thereof in a solvent which is inert under the reation conditions. Examples of solvents include primary and secondary alkyl halides and aliphatic and cycloaliphatic hydrocarbon solvents. It is preferable to produce separate solutions of the alkyl aluminium halide on the one hand and a mixture of the metal halide and tertiary butyl halide on the other hand. For both solutions, the hydrocarbon solvent is suitably a mixture of cyclohexane and isooctane. Even if separate solutions are produced, it is preferable to feed the two catalyst component stream simultaneously into the polymerisation reactor.

The polymerisation reaction is suitably carried out at a temperature between −30° and +35° C., preferably between −5° C. and −25° C.

The invention is further illustrated with reference to the following Examples.

EXAMPLE 1

A $C_4$-stream of the composition shown below was fed at a rate of 1800 ml/h (1080 g/h) to a flask maintained at −10° C. to −14° C. over a period of 2.5 h, the reactor capacity being such that the residence time was 7.5 min. Simultaneously two catalyst component streams were fed to the reactor. The first was a solution of ethylaluminium-dichloride (EADC) dissolved in a 4 to 1 mixture of cyclohexane and isooctane and the second was a similar solution of titanium tetrachloride and tert-butylchloride (TBC), the three catalyst components being fed in equimolar amounts. The weight of ethyl-aluminium-dichloride fed amounted to 100 ppm of the $C_4$-stream.

Polymerisation was rapid and the unconverted $C_4$-hydrocarbons had the composition shown below:

|  | Feed | Effluent |
|---|---|---|
| iso-Butane | 5.13 | 6.59 |
| n-Butane | 10.27 | 14.00 |
| Butene-1 | 26.13 | 33.90 |
| iso-Butene | 48.45 | 31.79 |
| Trans-Butene-2 | 7.30 | 9.84 |
| cis-Butene-2 | 2.75 | 3.66 |

-continued

| | Feed | Effluent |
|---|---|---|
| Butadiene | 0.1 | 0.14 |

50.9% of the isobutene fed was converted to polyisobutene.

After isolation of the polymer it had the following properties:

| Appearance: | Water White |
|---|---|
| Viscosity (SSU/210° F.): | 3,700,000 |
| Mw: | 83,600 |
| Dispersion index: | 4.94 |

The above Example clearly shows that it is possible to obtain high molecular weight products at relatively high temperatures and with minimal catalyst consumption.

EXAMPLES 2–15

These Examples were carried out as follows

The hydrocarbon fed to the reaction in all these Examples was a "butadiene plant raffinate" containing 45–48% isobutene, up to 40% n-butenes, and a minor proportion of butanes. In this feedstock the level of catalyst poisons was very low, namely water (10 ppm), vinyl acetylene (10 ppm) and butadiene (0.2%).

The catalysts were added as solutions in a 4:1 v/v mixture of cyclohexane and isooctane.

The polymerisation products were worked up in a conventional manner by killing the catalyst with diethylene glycol, diluting with cyclohexane, water washing and stripping in vacuum to 200° C. at 5 mm Hg pressure.

| Example No. | Catalyst Component (wppm) EADC | Catalyst Component (wppm) TiCl$_4$ | Catalyst Component (wppm) TBC | Temp (°C.) | Isobutene Concentration in Reactor Liquid* (vol %) | Isobutene Conversion (%) | Polyisobutene Viscosity SSU at 210° F. × 10$^{-5}$ |
|---|---|---|---|---|---|---|---|
| 2 | 70 | 105 | 50 | −25/−26 | 33.11 | 32.9 | 150 |
| 3 | 50 | 99 | 50 | −17/−20 | 29.63 | 39.3 | 82 |
| 4 | 60 | 90 | 45 | −16/−20 | 30.2 | 37.2 | 69 |
| 5 | 70 | 105 | 55 | −10 | 30.3 | 36.8 | 55 |
| 6 | 65 | 100 | 50 | −10 | 27.77 | 43.3 | 51 |
| 7 | 70 | 105 | 55 | −10 | 28.23 | 41.0 | 51 |
| 8 | 60 | 80 | 21 | −6/−7 | 39.03 | 20.0 | 31 |
| 9 | 60 | 80 | 21 | −6 | 39.7 | 20.4 | 29 |
| 10 | 70–75 | 112.5 | 27 | −6 | 34.8 | 29.3 | 27.5 |
| 11 | 30 | 42 | 17 | −6 | 28.4 | 39.0 | 21 |
| 12 | 34 | 44 | 18 | −6 | 24.0 | 42.4 | 19.6 |
| 13 | 36 | 54 | 21 | −6 | 21.92 | 52.9 | 18.5 |
| 14 | 36 | 48 | 19 | −6 | 20.4 | 56.6 | 18.1 |
| 15 | 31 | 42 | 17 | −6 | 21.1 | 56.0 | 18.0 |

EADC is Ethyl Aluminium Dichloride
TBC is Tert-Butyl Chloride
*Values of isobutene in reaction mixture calculated back from raffinate composition and % conversion.

EXAMPLE 16

The procedure of Examples 2–15 was repeated using the reaction conditions and catalyst indicated below. The catalyst concentration (ppm) was based on the feedstock, in this case butadiene raffinate.

| Catalyst concentration (% w/v) in solvent | Rate (ml/h) | Catalyst Concentration | Reaction Temp °C. |
|---|---|---|---|
| EADC 0.54 | 11.5 | 57 ⎫ | −16 |
| TiCl$_4$ 0.809 ⎫ | 13.0 | 97 ⎬ | |
| TBC 0.197 | | 23 | |

| | Feed | Raffinate | Conversion % | Polyisobutene Product (SSU × 10$^{-5}$) |
|---|---|---|---|---|
| Butenes | 12.727 | 15.36 | ⎫ | |
| Butene-1 | 21.06 | 26.65 | ⎬ | |
| Isobutene | 45.3 | 39.12 | 30.0 | 123 |
| Butene-2's | 19.83 | 17.75 | ⎭ | |

This example shows that very low concentrations of EADC and TBC in the presence of TiCl$_4$ have an acceptably high activity for the polymerisation of isobutene in mixed dry C$_4$'s. At these levels without TiCl$_4$, no polymerisation would occur (see Comparative Test 1 below).

EXAMPLE 17

The process of Examples 2–15 was repeated using the following reaction conditions and catalyst concentration (ppm) based on the feedstock which in this case was isobutene/isobutane/n-butane.

| Concentration (w/v %) in solvent | Rate(ml/h) | Catalyst Concentration | Reaction Temp °C. |
|---|---|---|---|
| EADC 0.54 | 12 | 60 ⎫ | −1 |
| TiCl$_4$ 0.809 ⎫ | 13 | 97 ⎬ | |
| TBC 0.197 | | 23 | |

| | Feed | Raffinate | Conversion % | Polyisobutene Product (SSU × 10$^{-5}$) |
|---|---|---|---|---|
| Isobutene | 75.95 | 85.4 | | |
| n-Butane | 2.91 | 1.2 | ⎫ | 16.8 |
| Isobutene | 21.13 | 13.43 | 41.8 ⎬ | |

The results show that the EADC/TiCl$_4$/TBC catalyst combination is also highly active for polymerisation of isobutene in the absence of linear C$_4$ olefins.

COMPARATIVE TEST 1

(not according to the invention)

Using a feedstock similar to that of Example 16, a test was carried out with the catalyst system EADC/TBC without the TiCl$_4$. The catalyst concentration (ppm)

was based on the feedstock. The reaction conditions and results are shown below.

| Concentration (% w/v) | Rate (ml/h) | Catalyst Concentration | Reaction Temp °C. |
|---|---|---|---|
| EADC 2.16 | 20 | 400 | −20 |
| TBC 1.57 | 20 | 290 | |

| | Feed | Raffinate | Conversion % | Polyisobutene Product (SSU × 10⁻⁵) |
|---|---|---|---|---|
| Butanes | 15.6 | 16.55 | | |
| Butene-1 | 24.6 | 26.75 | | |
| Isobutene | 49.1 | 44.5 | 14.5 | 8.5 |
| Butene-2's | 10.7 | 11.9 | | |

The results show that even high concentrations of EADC/TBC catalyst have a low catalytic activity for polymerisation of isobutene in mixed C₄ which contain a relatively high proportion of isobutene and give a product of relatively low molecular weight and viscosity.

COMPARATIVE TEST 2

(not according to the invention)

Example 1 was repeated using 166 ppm of AlCl₃ alone as catalyst. The SSU viscosity of the product at 210° F. was 700,000.

EXAMPLE 18-21

The polymerisation reactions were carried out in a one liter, reaction flask at −6° C. and atmospheric pressure, target isobutene conversion being 60%. Approximately 440 g of C₄ hydrocarbons with the following approximate composition

| butanes | 17% |
|---|---|
| Isobutene | 47% |
| n-butenes | 26% | were charged to the flask and then initiator solutions in n-heptane having the concentrations shown in the Table below were introduced. The reaction conditions, the conversion % of the feed on the basis of gas chromatographic analysis and the viscosity of the polyisobutene polymer at SSU 210° F.×10⁻⁵ are also shown in the Table below.

ISOBUTENE POLYMERISATION WITH THE EADC/TiCl₄/TBC INITIATOR SYSTEM

| Example | Weight C₄'s Charged (g) | Initiator Molar Ratio EADC:TiCl₄:TBC | EADC Conc. (M) | EADC Vol. Feed (ml) | TiCl₄/TBC Conc. (M) | TiCl₄/TBC Vol. Feed (ml) | Temp. Range (°C.) | Isobutene Conversion (%) | Polymer Viscosity |
|---|---|---|---|---|---|---|---|---|---|
| 18 | 468.7 | 1:1:0.1 | 0.045 | 13.9 | TiCl₄/TBC/ 0.0426/ 0.0043 | 13.4 | −4.2 to −9.7 | 40 | 14 |
| 19 | 536.9 | 1:0.1:1 | 0.045 | 26.6 | 0.00426/ 0.082 | 26.6 | −5.3 to −9 | 41.3 | 10.5 |
| 20 | 440.2 | 1:10:1 | 0.045 | 3.4 | 0.442/ 0.043 | 3.4 | −4.5 to −8 | 58 | 28.2 |
| 21 | 449.8 | 1:1:1 | 0.045 | 10 | 0.0438/ 0.0432 | 10 | −4.8 to −9 | 63 | 14.6 |

EADC—Ethyl Aluminium Dichloride
TBC—Tertiary Butyl Chloride

EXAMPLES 22-27

The polymerisation reactions were carried out by charging into a reaction flask a C₄ stream having the following approximate composition:

| butanes | 11.5% |
|---|---|
| isobutene | 48.8% |
| n-butenes | 39.7% |

Thereafter the catalyst components were introduced into the flask separately but simultaneously, (i) as a solution of the respective trialkyl aluminium or aluminium alkyl halide, and (ii) as a solution of a mixture of the metal halide and tertiary butyl halide.

These solutions were prepared in the specified concentrations in a mixture of n-heptane and the polymerisation carried out under the conditions specified in the Table below. The Table also indicates the polymer products obtained and their viscosity SSU at 210° F.×10⁻⁵. In all these Examples the n-butene was found to be practically unchanged, and there was no evidence of catalyst precipitation.

| Ex. No. | Weight of C₄ Charge (g) | Catalyst Details Component | Catalyst Details Conc. (w/v %) | Co-catalyst details Component | Co-catalyst details Conc. (w/v %) | Volume of Catalyst (ml) | Volume of co-Catalyst (ml) | Temp. Range (°C.) | Yield of Polymer (g) | Conversion of isobutene Ex.G.C. | Conversion of isobutene Ex.Yield | Polymer Viscosity |
|---|---|---|---|---|---|---|---|---|---|---|---|---|
| 22 | 231.8 | EADC | 0.54 | TiCl₄ + TBC | 2.4 to 0.2 | 7.5 | 7.5 | −9.6/ −6.6 | 48.0 | 44.8 | 42.5 | 34.2 |
| 23 | 237.0 | EADC | 0.54 | TiCl₄ + TBC | 2.4 + 0.2 | 7.1 | 7.1 | −9.8/ −6.5 | 51.0 | 43.9 | 44.2 | 42.75 |
| 24 | 241.4 | TIBA | 0.84 | SnCl₄ + TBC | 3.3 + 0.2 | 16.3 | 15.0 | −8.9/ −5.5 | 47.0 | 45.3 | 40.0 | 37.5 |
| 25 | 238.0 | TIBA | 0.81 | TiCl + TBC | 2.4 + 0.2 | 2.3 | 2.3 | −7.9/ −5.4 | 63.8 | 74.8 | 55.0 | 28.1 |
| 26 | 216.5 | TEA | 0.49 | TiCl + | 2.4 + | 4.2 | 4.3 | −9.7/ | 44.7 | 47.5 | 45.1 | 25.0 |

| Ex. No. | Weight of C$_4$ Charge (g) | Catalyst Details | | Co-catalyst details | | Volume of Catalyst (ml) | Volume of co-Catalyst (ml) | Temp. Range (°C.) | Yield of Polymer (g) | Conversion of isobutene | | Polymer Viscosity |
|---|---|---|---|---|---|---|---|---|---|---|---|---|
| | | Component | Conc. (w/v %) | Component | Conc. (w/v %) | | | | | Ex.G.C. | Ex.Yield | |
| 27 | 247.1 | DEAC | 0.51 | TBC<br>TiCl + TBC | 0.2<br>1.6 + 0.2 | 2.3 | 2.3 | −8.8<br>−13.6/<br>−10.0 | 37.7 | 35.1 | 31.3 | 23.48 |

EADC = Ethyl Aluminium Dichloride
TIBA = Triisobutyl Aluminium
TBC = t-Butyl Chloride
DEAC = Diethyl Aluminium chloride
TEA = Triethyl Aluminium

I claim:

1. A homogeneous polymerization process for producing high molecular weight polyisobutenes of SSU viscosity above 1,000,000 at 210° F. by polymerizing a C$_4$ feedstock comprising isobutene at a temperature of from −5° to −25° C. in the presence of a catalyst system comprising (i) an alkyl aluminum dichloride or dibromide, (ii) tertiary butyl chloride or bromide, and (iii) a metal halide selected from the group consisting of SnCl$_4$, SnBr$_4$, TiCl$_4$, and TiBr$_4$, and said catalyst concentration based on said alkyl aluminum dichloride or dibromide content thereof is from 20 to 2000 ppm based on the weight of said C$_4$ feedstock and said catalyst components are present in equimolar proportions.

* * * * *